United States Patent [19]

Mourey et al.

[11] Patent Number: 4,668,051
[45] Date of Patent: May 26, 1987

[54] MEMORY FERROELECTRIC DISPLAY ADDRESSED WITH AC AND DC VOLTAGES

[75] Inventors: Bruno Mourey, Boulogne Billancourt; Michel Hareng, La Norville; Jean Pierre Le Pesant, Bourg les Valences; Jean Noel Perbet, Gif Sur Yvette, all of France

[73] Assignee: Thomson CSF, Paris, France

[21] Appl. No.: 688,159

[22] Filed: Dec. 31, 1984

[30] Foreign Application Priority Data

Jan. 3, 1984 [FR] France .................... 84 00029

[51] Int. Cl.$^4$ .................................. G02F 1/133
[52] U.S. Cl. ........................ 350/350 S; 350/332
[58] Field of Search ............. 350/346, 332, 350 S

[56] References Cited

U.S. PATENT DOCUMENTS

| 4,009,934 | 1/1977 | Goodwin et al. | 350/346 |
| 4,386,836 | 6/1983 | Aoki et al. | 350/346 |
| 4,447,132 | 5/1984 | Zwart | 350/346 |
| 4,508,429 | 4/1985 | Nagae | 350/350 S |
| 4,548,476 | 10/1985 | Kaneko | 350/350 S |
| 4,563,059 | 1/1986 | Clark et al. | 350/350 S |

FOREIGN PATENT DOCUMENTS

| A0032362 | 7/1981 | European Pat. Off. |
| 0062499 | 10/1982 | European Pat. Off. |
| A0092181 | 10/1983 | European Pat. Off. |

OTHER PUBLICATIONS

Applied Physic Letters, vol. 43, No. 4, 15 Aug. 1983, pp. 342–344.

Molecular Crystals and Liquid Crystals, vol. 40, 1977, pp. 33–48.

Primary Examiner—John K. Corbin
Assistant Examiner—David Lewis
Attorney, Agent, or Firm—Cushman, Darby & Cushman

[57] ABSTRACT

A memory display device using a chiral C or H smectic liquid crystal, comprising a liquid crystal cell in which optically discernible textures are induced by means of DC electric fields of appropriate signs, these textures being maintained under the effect of AC electric fields.

7 Claims, 9 Drawing Figures

FIG. 6
(PRIOR ART)
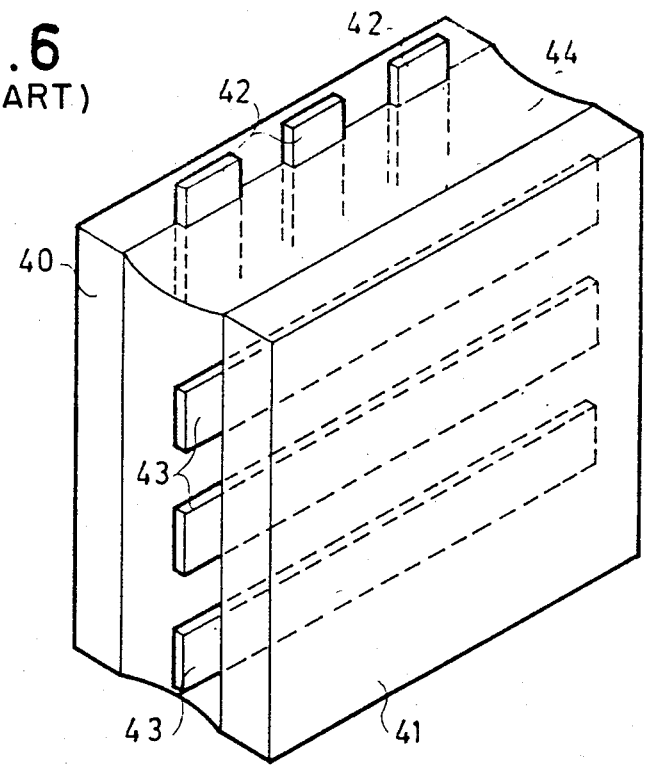
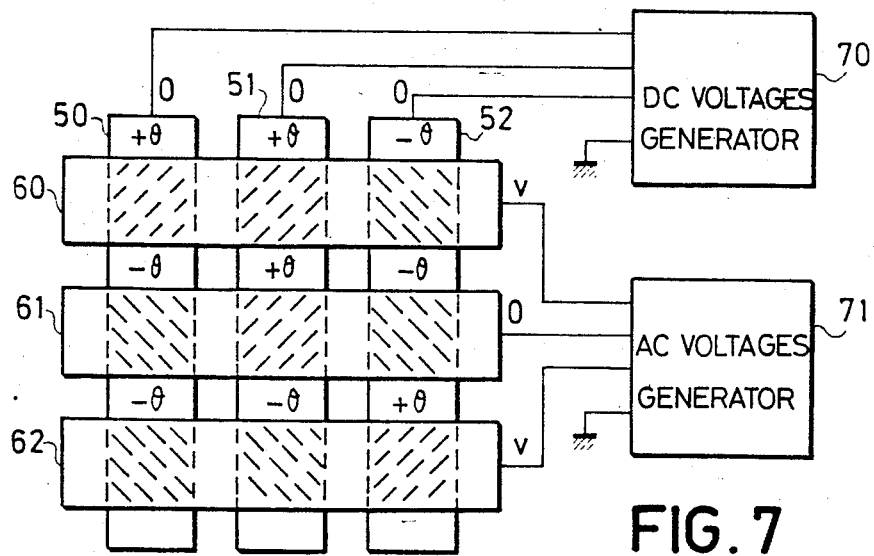
FIG. 7

MEMORY DISPLAY ADDRESSED WITH AC AND DC VOLTAGES

BACKGROUND OF THE INVENTION

1. Field of the Invention

The invention relates to memory display devices of the maxtrix addressing type using ferroelectric smectic liquid crystals in which a memory effect is obtained by means of a stabilizing electric field.

2. Description of the Prior Art

Liquid crystals occupy at the present time a very important place in the field of display devices. This is due in particular to the electro-optic effects provided by liquid crystals of the twisted nematic type. The great success of this effect resides in its simplicity in use, its low control voltages and its low power consumption. The main disadvantages of these devices is that, despite much research work in this field, its multiplexing rate seems limited to about 100. This is an unquestionable handicap in the use of this effect for high definition matrix screens, comprising for example several tens of lines of characters. Therefore research work has turned towards memory electro-optical effects for which the multiplexing rate is theoretically infinite.

Multiplexing rates have been substantially increased by using solutions which may be classed into two families. A first family groups together the devices comprising an integrated control matrix in which each picture element is placed in series with a non linear element of the varistor, thin layer transistor, series and opposition mounted diode type, etc... a second family of solutions groups together the devices which use materials having a memory electro-optical effect. Among these devices of this second family, those may be mentioned using the combined thermal and electric effect in smectic liquid crystals. Those may also be mentioned which use the effects of the electric field on a hybrid texture in a nematic crystal and whih have formed the subject matter of a patent application filed by the applicant bearing the national registration number 83 08135 filed on the May 17, 1983.

The electro-optical effects observed in ferroelectric smectic liquid crystals offers an interesting solution to the problems of intrinsic memory effects. Studies carried out in numerous laboratories have shown that an electro-optical effect could be obtained by reversing the ferroelectric field polarization in ferroelectric smectic phases. With respect to smectics A in which the molecules are normal to the planes of the smectic layers, the molecules of ferroelectric smectic liquid crystals have in general a slant with respect to the plane of the layers. A rotation of the slant direction of these molecules also occurs about the normal to the plane of the layers in a low pitch twist (a few micrometers).

CLARK AND LAGERWALL have shown, in the European patent application published under number 0 032 362 and filed on the Jan. 10, 1980, that with cells of small thickness, it is possible to induce two stable directions of orientation of the liquid crystal molecules which may form opposed optical axis and polarization fields. Switching between these two directions is achieved by applying an appropriate electric field thereto. These cells, used as elementary optical valves, have as main characteristics: that of being bistable systems so having a memory, that of possessing short response times, that of requiring low control voltages and that of having low energy consumption.

However, this type of device presents two major drawbacks. First of all it requires surface treatment of the two internal faces of the plates supporting the cell which must lead to an equivalent energy for the two textures (corresponding to the two stable directions of orientation of the molecules) so that they may exist simultaneously in the absence of an applied electric field. This treatment must however allow surface sliding of the molecules during switching from one texture to another. A surface treatment having these two properties is very difficult to achieve in a reproducible way. Secondly, these devices require blocking by limit surfaces of the twist due to the chirality of the ferroelectric liquid crystal molecules and consequently impose very small thicknesses on the liquid crystal layer. These thicknesses (less than three micrometers) are very difficult to obtain industrially over large surfaces.

SUMMARY OF THE INVENTION

In order to overcome these disadvantages, the present invention proposes maintaining the stable states which are induced in the ferroelectric liquid crystal layer by a DC electric field, not by thickness and anchorage constraints, but by an alternating blocking electric field.

The invention therefore provides an electric controlled and memory information display device comprising a cell with a mesomorphic material film having ferroelectric properties, said film being disposed between two parallel transparent plates, each of said plates supporting on its internal face at least one transparent electrode for applying an electric field in at least one region of said film, said plates having received surface treatments which contribute to the existence within said film of at least two discernible textures, further comprising means for creating a DC electric field which selects, depending on its sign and in the absence of an AC electric field, one of the two textures and means for creating an AC electric field for maintaining the texture previously chosen, the frequency of this field being greater than the relaxation frequency of said electro-optical material.

BRIEF DESCRIPTION OF THE DRAWINGS

The invention will be better understood and other advantages will appear from the following description and accompanying Figures in which:

FIG. 6 is an isometric view of a display screen, and

FIGS. 7 to 9 illustrate the addressing principle in accordance with the invention.

DETAILED DESCRIPTION OF THE PREFERRED EMBODIMENT

In an article published in Le Journal de Physique, vol. 36 (1975, L69), MEYER et al showed that liquid crystals such as the chiral C and H smectic liquid crystals were ferroelectric. In these materials, the electric dipoles P are perpendicular to the direction of the molecules and parallel to the plane of smectic crystals. The chirality confers on these materials a helical structure such that, on the macroscopic scale, the resulting polarization is zero through symmetry of revolution. The polarization then appears only after destruction of the helix or twist. The spontaneous polarization in these phases is not due to the electric field $\vec{E}$ applied, so that coupling between the field E and the orientation of the molecules is linear, as distinct from dielectric materials where the coupling is quadratic. For ferroelectric liquid crystals, the coupling depends then on the direction of the electric field applied. In addition, with a low field $\vec{E}$, this coupling seems greater than that due to the dielectric anisotropy of the liquid crystals. MARTINO-LAGARDE studied the reversal of these ferroelectric dipoles under an applied electric field (Le Journal de Physique, volume 38, January 1977, pages L17 to L19). He gave the first direct measurement of the permanent polarization $\vec{P}$, its variation with the temperature and the reversal time of the dipoles.

An explanation will first of all be given of the symbolism generally used for representing the different positions of the molecules of a ferroelectric liquid crystal of the chiral C smectic type.

Figure 1:
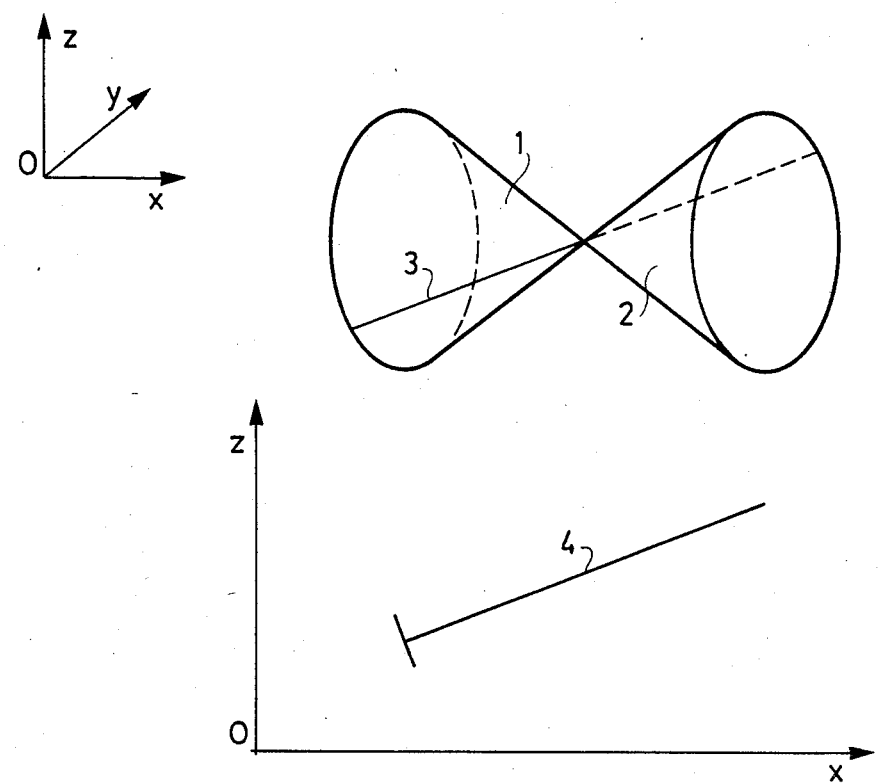
FIGS. 1 and 2 are explanatory Figures.
Figure 1:
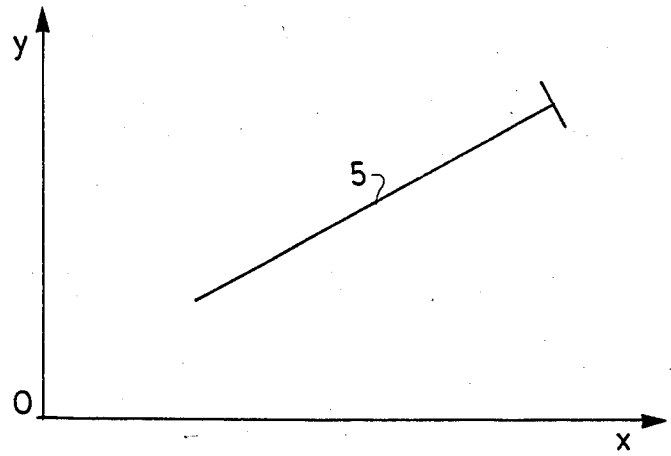
Figure 2:
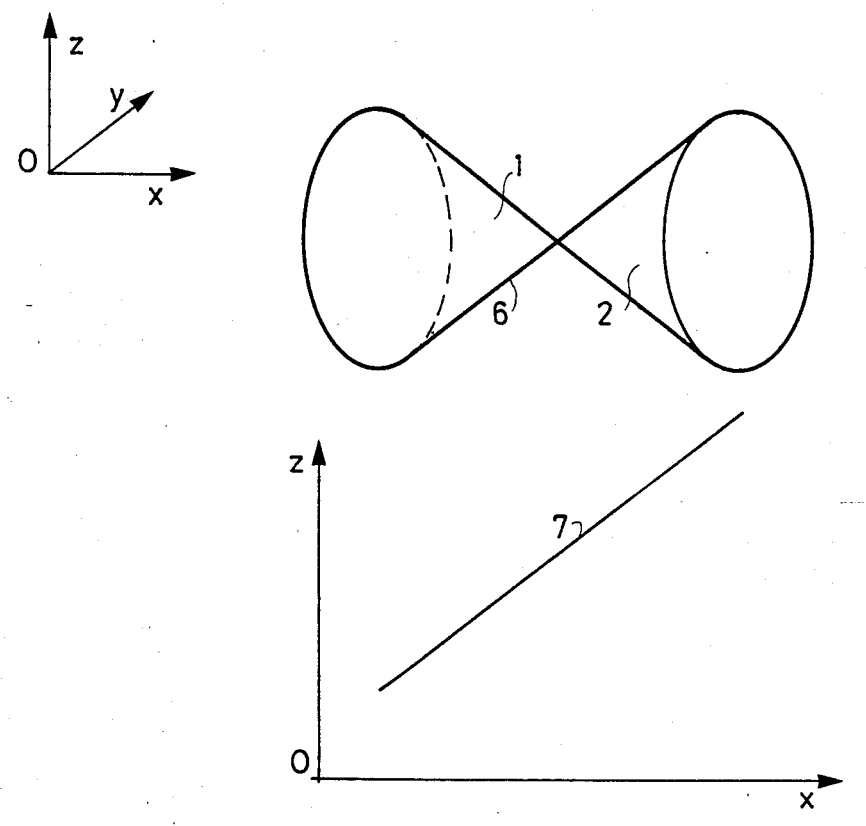
Figure 2:
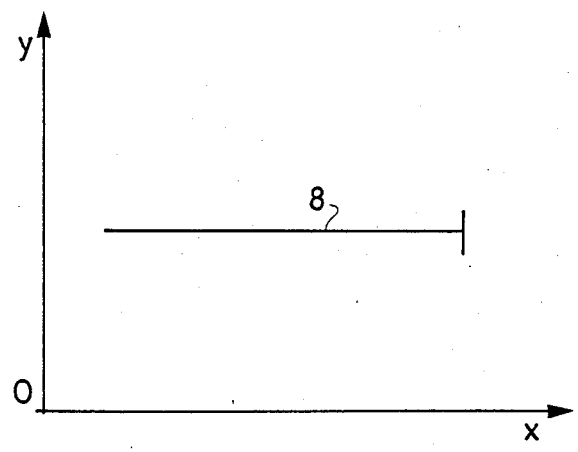

FIGS. 1 and 2 are Figures for explaining the symbolism used. For showing the twisted structure which governs the ordering of the materials considered, a model is shown formed of identical aligned cones 1 and 2 which touch at their apices. The spatial arrangement of the molecules is such that they may be shown as generatrices of the model which capable, by pivoting around the common apex, of covering the envelope of the two cones. To situate the position of a molecule in space, the symbolism of nails is the most obvious one. Thus, in FIG. 1, a molecule situated on the generatrix 3 will be represented in planes xOz and xOy, belonging to an orthonormed trihedron Oxyz, respectively by nails 4 and 5. The head of the nails signifies that the corresponding part of the molecule is situated in front for a person looking at the drawing. This explains why the nails are directed differently for the planes xOz and xOy depending on whether the model is examined from the front or from the top.

In FIG. 2, the molecule shown is situated along the generatrix 6, i.e. in the plane xOz; in this case, the symbolism of the nail is pointless and a straight line 7 is sufficient. On the other hand, the molecule penetrates slantwise into plane xOy as shown by the nail 8.

Figure 3:
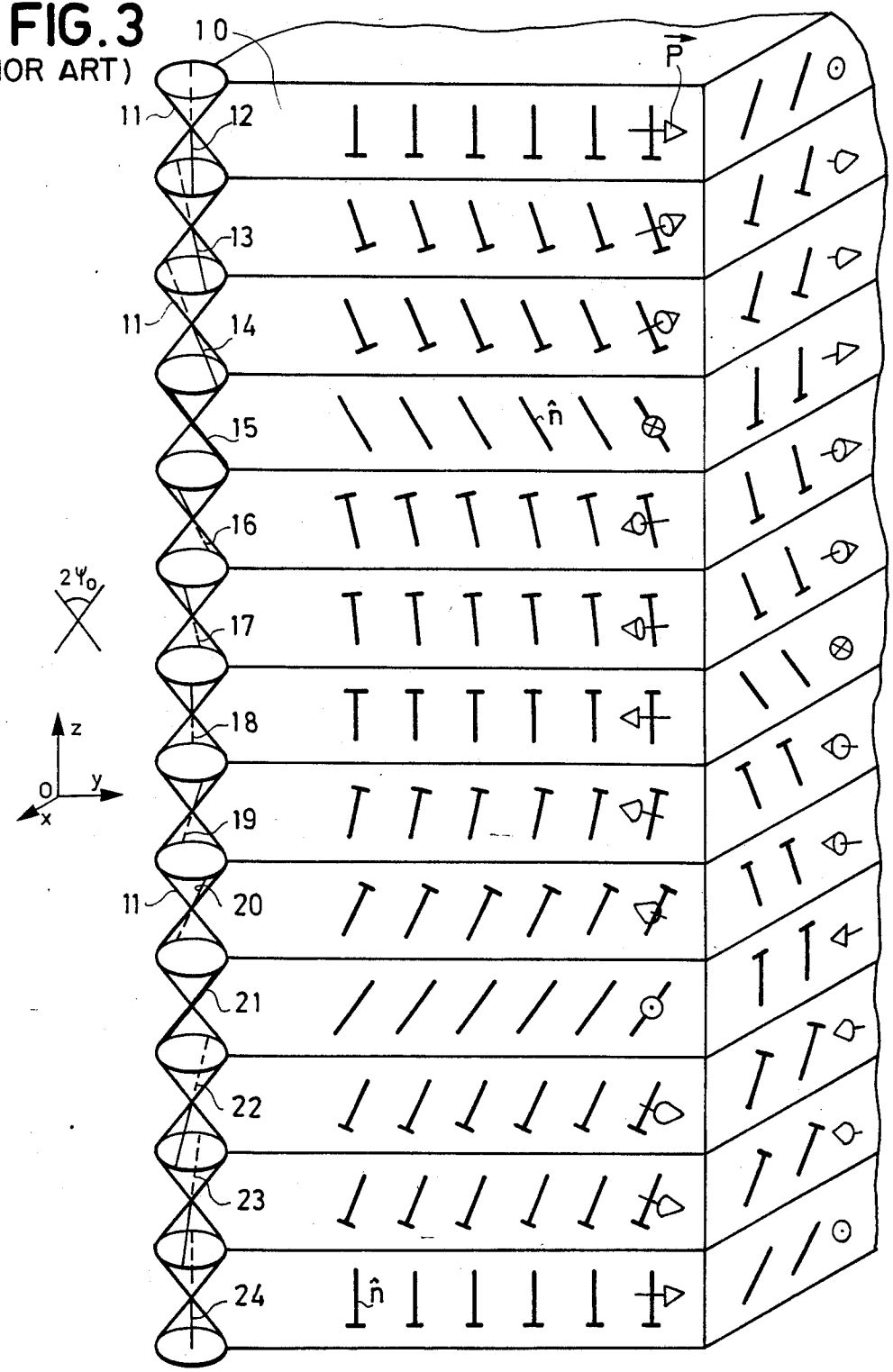
FIG. 3 is a known representation of a ferroelectric liquid crystal.

FIG. 3 is a known representation of a chiral liquid crystal of the C or H smectic type. It is inspired from the teaching given in FIGS. 1 and 2. The liquid crystal is formed from layers. In each layer, the mean direction of the molecules is given by the unit vector represented by a nail or a straight line depending on the case. The succession of cones 11 situated on the left of the Figure allows the evolution of the direction of the molecules to be understood when passing from one layer to another. The cones are aligned along a straight line passing through their apices and perpendicular to the plane of the layers. Molecules 12 to 24 are slanting at an angle $\psi_o$ with respect to this straight line. Each molecule has an electric dipole $\vec{p}$ which is perpendicular to the large axis of the molecules and parallel to layers 10. Because of the twisted structure of the molecules, the electric dipoles may take all the possible directions in the plane of the layers. This is why, on the macroscopic scale, the resulting polarization is zero.

Particular positions of the molecules are to be considered: these are the positions of molecules 12, 18 and 24 whose electric dipoles are able to have directions perpendicular to surrounding plates situated in planes parallel to xOz. These directions will be called hereafter $+\theta$ or $-\theta$ depending on the sign of the dipole and will be representative of the bistable effect.

So as to be able to use materials such as chiral C or H smectic liquid crystals in cells with a bistable effect, CLARK AND LAGERWALL, in the above mentioned patent application, were led to suppress the twisted structure of these materials. The suppression of the twisted structure was obtained in the following way. The thickness of the liquid crystal layer in the cell is chosen sufficiently small (of the order of 1.5 micrometer) so as to prevent a twist or helix from being established, taking into account the orientation conditions at the limits. These conditions of thickness and orientation induce two possible stable textures or states. These textures have non zero macroscopic polarization.

Figure 4:
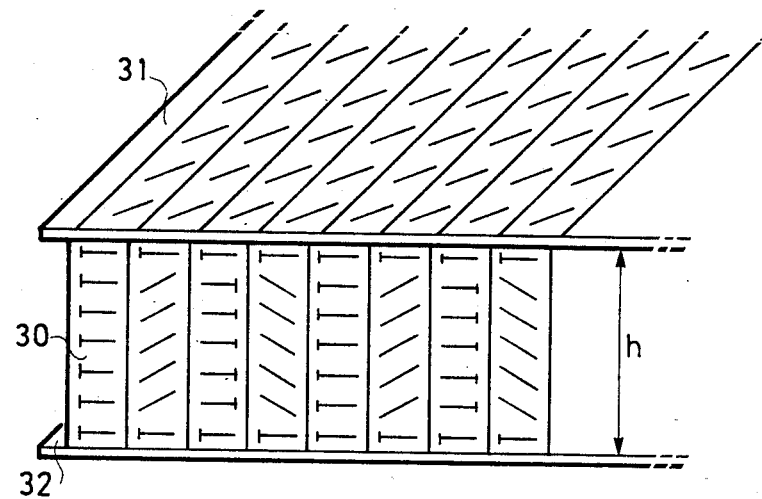
FIGS. 4 and 5 are partial views of a ferroelectric liquid crystal cell.

FIG. 4 is a partial view of a liquid crystal cell. The liquid crystal 30 is confined between two plates 31 and 32 whose internal faces have been treated so as to give a preferential orientation to the molecules situated in the vicinity. The other molecules are orientated as shown in the diagram of FIG. 3. The macroscopic polarization due to the electric dipoles is zero. The twisted structure persists as long as the distance h between the plates 31 and 32 is greater than the pitch of the helix or twist (about 3 micrometers).

Figure 5:
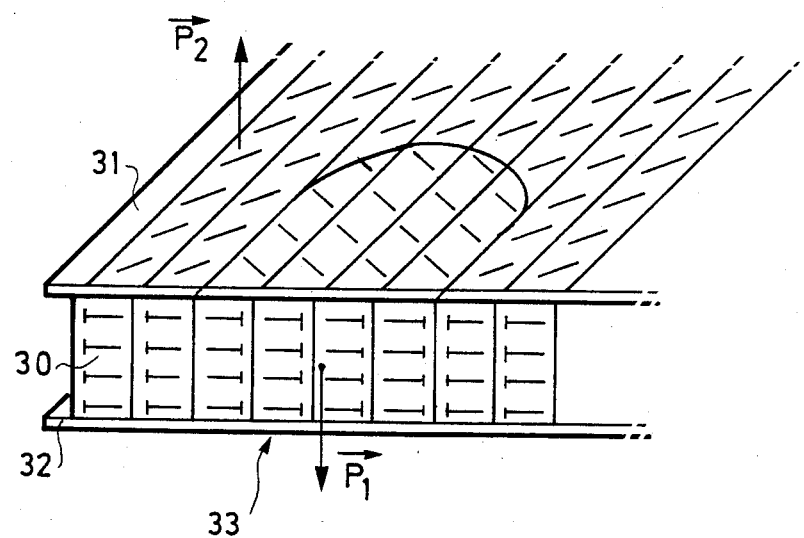

FIG. 5 shows the same type of cell as before but for a distance h less than the pitch of the helix or twist. The establishment of a twisted structure is then no longer possible and the molecules are oriented so that the electric polarization is in one direction or in the directly opposite direction for each smectic layer. The distribution of the electric dipoles becomes uncertain. In fact, it is whole zones which present a polarization in one direction or the other. This is what is shown in FIG. 5 where it can be seen that the overall polarization $\vec{P_1}$ of zone 33 has a sign opposite the polarization $\vec{P_2}$ of the visible remainder of the cell.

The application to liquid crystal 30 of positive or negative DC electric field $\vec{E}$ perpendicular to plates 31 and 32 causes the whole of the structure to swing through coupling between the field E and the polarization $\vec{p}$ of the liquid crystal. When the electric field is cut off, the texture which was priviledged, depending on the sign of field $\vec{E}$, is maintained. It is then indeed a memory effect which contaniues to exist because of the constraints of thickness and anchorage imposed.

Optical read out of the effect may take place in two ways. The cell may be placed between crossed polarizers, with birefringance operation. A dichroic dye may also be incorporated in the ferroelectric liquid crystal and, in this case, a single polarizer is sufficient. The light having a polarization direction parallel to the dye molecules is then absorbed whereas that with a perpendicular direction of polarization is not.

The invention proposes overcoming the constraints of thickness and anchorage by using two types of effect of electric field on the ferroelectric liquid crystals. A first effect, linear in the electric field, is due to the above mentioned coupling $\vec{P}.\vec{E}$ A second effect, quadratic in the electric field, is due to the dielectric coupling which may be met in all liquid crystals. It is the anisotropy $\Delta\epsilon$ of the dielectric constants which is responsible for the second effect. The anisotropy $\Delta\epsilon$ is the difference between the dielectric permittivity parallel to the normal to the planes of the layers ($\epsilon_\parallel$) and the dielectric permittivity perpendicular to this normal ($\epsilon_\perp$). When the anisotrpy $\Delta\epsilon$ is positive, the molecules of the liquid crystal are oriented parallel to the electric field. When Δε is negative, the liquid crystal molecules are oriented perpendicularly to the electric field. A low frequency electric field, i.e. continuous or of a frequency less than the relaxation frequency of the molecules of the liquid crystal, implies a preponderant linear coupling. For a high frequency electric field, i.e. of a frequency greater than the relaxation frequency, it is the dielectric coupling which will be preponderant.

This frequency behavior is used in the invention for stabilizing the two textures determining the bistable operation. It is necessary for the ferroelectric liquid crystal to have a negative dielectric anisotropy so that the molecules are orientated perpendicularly to the electric field.

The liquid crystal used may for example be 4' n-heptyloxyphenyl-(4" methylhexyloxy)benzoate whose formula is the following

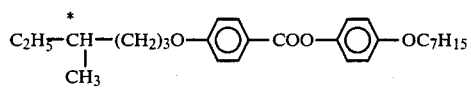

and which has the following phase transitions:

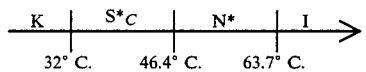

Chiral smectic liquid crystals or mixtures of the same type which have other phase transitions may of course be used, for example those which have the following successions of phases:

The presence, among the phase successions, of a cholesteric phase facilitates the ordering of the molecules. The presence of a smectic phase A facilitates the arrangement of the liquid crystal layers. Other ferroelectric materials may also be used such as Chiral H smectic liquid crystals.

The elementary cell for implementing the invention is formed from two transparent plates, made for example from glass, coated on their internal face with transparent conducting electrodes closing the ferroelectric liquid crystal. In order to have a uniform texture, the internal faces of the cell must be treated. This may be achieved by depositing an alignment layer giving a planar orientation to the molecules. Thus, the liquid crystal molecules will, on the surface, be parallel to the glass plates and the planes of the smectic layers will be perpendicular to these plates. The spacing between the two plates is chosen greater than the critical spacing below which the twisted structure no longer exists. The liquid crystal then has inside the cell a twisted structure orientated parallel to the glass plates in a given direction.

The liquid crystal is preferably introduced between the two plates while it is in the isotrope phase. When returning to the ambient temperature, the molecules take up an order depending on the different phases passed through. To improve the orientation of the smectic layers, a slight shearing effect, produced by very slight sliding of the surrounding plates with respect to each other, may be effected during nematic-C* smectic transition or during the A smectic-C* smectic transition, when these transitions exist.

The application of a high frequency electric field to a liquid crystal layer of negative Δε anisotropy orientates the molecules of this liquid crystal in a direction parallel to the surrounding plates. Unwinding of the twist and pivoting of the molecules about a cone with access parallel to the plates then occur. The high frequency field has the same twist blocking effect as the thickness constraint used in the prior art. It is the use of this effect which forms the subject of the invention. In order to choose one of the two above defined states or textures $+\theta$ or $-\theta$, a DC field is applied which induces the desired texture. An AC electric field is then applied so as to maintain the state obtained. The memory of the effect is then obtained by means of a stabilizing high frequency field.

The ferroelectric coupling only acts to effect switching in the absence of the high frequency electric field. The high frequency electric field for maintaining the chosen state may coexist with a DC electric field as opposed to switching.

A display device using the invention is for example represented by a screen comprising a ferroelectric liquid crystal film placed between two glass plates coated on their internal surface with line and column electrodes formed from a thin layer of a transparent conducting material etched according to known techniques. This material may be combined indium and tin oxide.

FIG. 6 shows an isometric view of a display screen such as it has just been defined. The two glass plates 40 and 41 can be seen which support respectively column electrodes 42 and line electrodes 43. The space defined between plates 40 and 41 by shims not shown is of the order of 10 micrometers or so. This space is filled by a ferroelectric liquid crystal film 44, for example 4' n-heptyloxyphenyl-(4" methylhexyloxy)benzoate the formula and phase diagram of which were given above. On the internal faces of the device an alignment layer has been deposited giving a planar orientation to the molecules of the liquid crystal. The liquid crystal is thus formed from layers perpendicular to plates 40 and 41. The alignment layer is formed for example by oblique evaporation of silicon oxide SiO or from an organic polymer layer rubbed or not. The thickness of film 44 is not preponderant, the maintenance of the two textures $+\theta$ and $-\theta$ being provided by dielectric coupling and not by a thickness constraint. A thickness of about 10 micrometers is satisfactory for technological reasons.

The optical reading of the two textures $+\theta$ and $-\theta$ takes place as before: either by placing the device of FIG. 6 between crossed polarizers and working under birefringence conditions, or by incorporating a dichroic dye in the liquid crystal. For the film thickness envisaged in the device of the invention, the use of dichroic dyes and one polarizer is preferable. In fact, optical birefringence readout is very sensitive to thickness variations.

Figure 8:
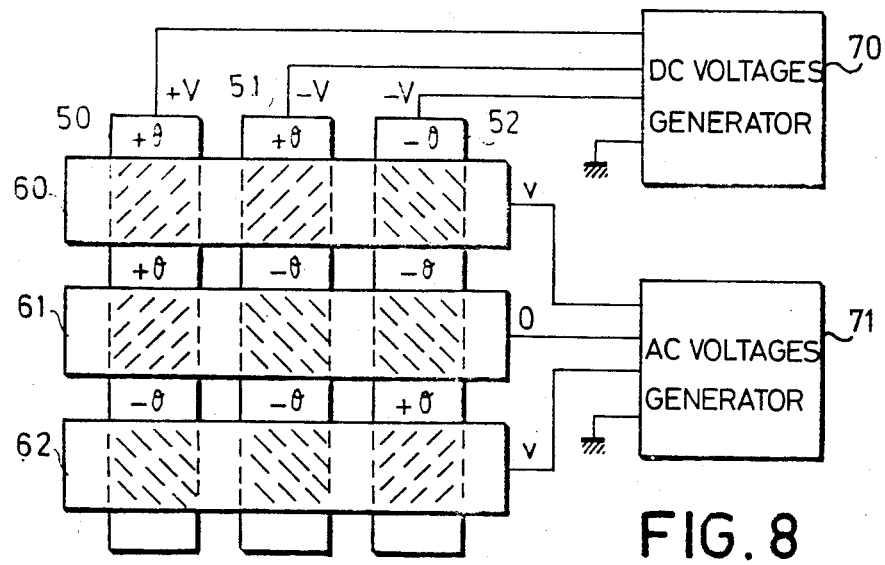
Figure 9:
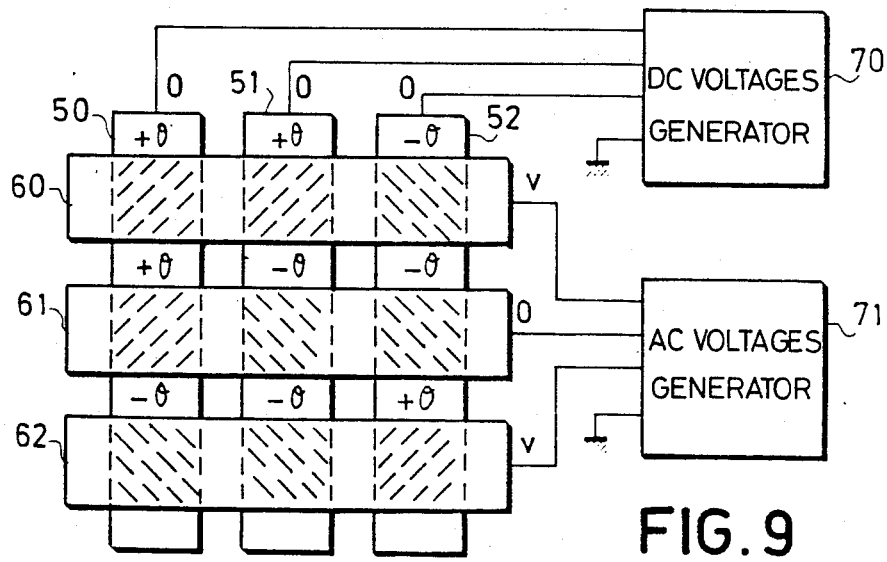

FIGS. 7, 8 and 9 illustrate the addressing principle. For the convenience of the explanation, only the line electrodes 60 to 62 and column electrodes 50 to 52 of a display device have been shown. The state of the texture $+\theta$ and $-\theta$ is shown, as in FIG. 5, by small strokes slanted in one direction or in the other. In FIG. 7, starting with any inscribed state where we have for example a $+\theta$ texture for the picture elements corresponding to the intersections of electrodes 50 and 60, 51 and 60, 61 and 51, 62 and 52. A $-\theta$ texture corresponds to the other picture elements. With the device in any inscribed state, the DC voltages supplied to the column electrodes by generators 70 are zero. Generator 71 supplies AC voltages v which ensure the existence of alternating fields for maintaining the $+\theta$ or $-\theta$ textures. The electric continuity of the assembly is provided by the grounds of generators 70 and 71. For addressing line 61 for example, the alternating electric field (called high frequency field) must be suppressed which maintains the textures and which acts between electrodes 61 and electrodes 50, 51 and 52. This is what is shown in FIG. 7.

Writing of the information is then achieved by applying to the column electrodes potentials of given signs depending on the desired textures. In the example chosen to FIG. 8, electrode 50 is brought to the potential $+V$ and electrodes 51 and 52 to the potential $-V$. In this writing step, there is no high frequency field between electrodes 61 and electrodes 50, 51 and 52.

In FIG. 9, the DC potentials are discontinued and a high frequency information maintaining field is applied between electrodes 61 and electrodes 50, 51 and 52. Another line may then be addressed. It is preferable to carry out steps 7 and 8 at the same time. The steps shown by FIGS. 7, 8 and 9 must be carried out whenever it is desired to change the information memorized on a line.

This way of addressing is due to the decoupling effect which the frequency response of the ferroelectric liquid crystal provides. In the example chosen, a high frequency voltage for maintaining the information has been applied to the line electrodes of the screen and positive or negative voltages for writing in information has been applied to the column electrodes. The screen may of course be addressed without any difficulty column by column rather than line by line. The role of the high frequency field is not disturbed by the presence of DC fields, all things considered. Consequently, the information memorized will not be disturbed by the addressing voltages of the second step of the addressing cycle.

The DC voltages used may be of the order of $V=10$ to 100 volts. The amplitude of the AC voltages may be of the order of a few tens of volts for a frequency of a few kilohertz. The addressing speed depends on the amplitude of the DC addressing voltage and increases therewith. However, the difference between the amplitudes of the DC and AC voltages must not be too great, if not there would be a risk of the memorized points being influenced by a DC addressing voltage which is too strong. It should also be noted that the devices of the invention are not energy consumers.

What is claimed is:

1. An electric control and memory information display device including a cell with a mesomorphic material film having ferroelectric properties, said film being disposed between two parallel and transparent plates, each of said plates supporting on its internal face at least one transparent electrode for applying an electric field in at least one region of said film, said plates formed with surface treatments which contribute to the existence within said film of at least two discernible textures, said device comprising:

means for selecting one of said two textures by creating a DC electric field in the absence of an AC electric field, one of the two textures being selected depending on the polarity of said DC electrical field; and means for maintaining the texture previously chosen by creating an AC electric field, the frequency of this field being greater than the relaxation frequency of said mesomorphic material.

2. The display device as claimed in claim 1, wherein said mesomorphic material is a chiral C smectic liquid crystal.

3. The display device as claimed in claim 1, wherein said mesomorphic material is a chiral H smectic liquid crystal.

4. The display device as claimed in claim 1, further comprising optical means for allowing the induced textures to be discerned.

5. The display device as claimed in claim 4, wherein said optical means comprise crossed polarizers placed on each side of the cell, readout being provided by birefringence.

6. The display device as claimed in claim 4, wherein said optical means comprise a dichroic dye dissolved in said mesomorphic material and a polarizer.

7. The display device as claimed in claim 1, wherein the electrodes of said plates are disposed in lines and in columns so as to define an addressing matrix.

* * * * *